United States Patent [19]
Tennison et al.

[11] Patent Number: 5,571,421
[45] Date of Patent: Nov. 5, 1996

[54] PROCESS FOR SEPARATING COMPONENTS OF A LIQUID MIXTURE

[75] Inventors: Stephen R. Tennison, Weybridge; Derrick J. Watson, East Yorkshire, both of England

[73] Assignee: BP Chemicals Limited & British Petroleum Co. P.L.C., London, England

[21] Appl. No.: 277,498

[22] Filed: Jul. 19, 1994

[30] Foreign Application Priority Data

Jul. 21, 1993 [GB] United Kingdom .................. 9315081

[51] Int. Cl.⁶ .................................................. B01D 15/00
[52] U.S. Cl. ............................................ 210/674; 210/694
[58] Field of Search .................................. 210/664, 674, 210/676, 694; 562/580

[56] References Cited

U.S. PATENT DOCUMENTS

| | | | |
|---|---|---|---|
| 3,761,533 | 9/1973 | Otani et al. | 260/674 SA |
| 4,042,350 | 8/1977 | Phillips | 95/87 |
| 4,382,001 | 5/1983 | Kulprathipanja et al. | 210/674 |
| 4,478,723 | 10/1984 | Tanouchi et al. | 210/674 |
| 4,917,835 | 4/1990 | Lear et al. | 264/29.1 |
| 5,026,482 | 6/1991 | Sircar | 210/674 |
| 5,030,768 | 7/1991 | Chen et al. | 568/697 |
| 5,030,775 | 7/1991 | Sircar | 568/917 |
| 5,068,419 | 11/1991 | Kulprathipanja et al. | 562/580 |
| 5,116,510 | 5/1992 | Sircar et al. | 210/673 |
| 5,292,804 | 3/1994 | Chen | 525/62 |

FOREIGN PATENT DOCUMENTS

| | | |
|---|---|---|
| 132049 | 6/1984 | European Pat. Off. . |
| 0422421A1 | 9/1990 | European Pat. Off. . |
| 0512395A3 | 4/1992 | European Pat. Off. . |
| 280823 | 2/1952 | Switzerland . |

OTHER PUBLICATIONS

"Production of Motor Fuel Grade Alchohol By Concentration Swing Adsorption"; *Separation Science and Technology;* M. B. Rao & S. Sircar; 27(14) pp. 1875–1887 (©1992).
"Concentration–Thermal Swing Adsorption Process for Separation of Bulk Liquid Mixture"; *Separation Science and Technology;* M. B. Rao S. Sircar; 289(10) pp. 1837–1847 (©1993).
Derwent Abs. Acc. No. 92–028870/04.
Derwent Abs. Acc. No. 79–02874B/02.

(List continued on next page.)

*Primary Examiner*—Ivars Cintins
*Attorney, Agent, or Firm*—Fay, Sharpe, Beall, Fagan, Minnich & McKee

[57] ABSTRACT

A process for separating components of a liquid mixture comprising a more adsorbable component (A), for example $C_1$ to $C_6$ carboxylic acids, and a less adsorbable component (B), for example water, wherein the relative adsorbity of component (A), component (B) and a desorbent liquid (D) with respect to an adsorbent in an adsorption column is in the order D>A>B, which process comprises the steps in sequence of: (a) passing the liquid mixture through an adsorption column containing the adsorbent and selectively adsorbing component (A) while discharging a stream enriched in component (B); (b) rinsing the adsorbent in the adsorption column after step (a) with desorbent liquid (D) which is immiscible with component (B) whereby component (A) is displaced from adsorbent by desorbent (D) and withdrawing from the adsorption column a first liquid phase stream comprising a mixture of component (A) and component (B) and withdrawing from the adsorption column a second liquid phase stream comprising a mixture of desorbent (D) and component (A); and (c) thermally displacing desorbent (D) from the adsorbent in the adsorption column after step (b).

Preferably, the desorbent (D) forms an azeotrope with component (B). Suitable adsorbents are highly micro-porous activated carbons.

23 Claims, 6 Drawing Sheets

OTHER PUBLICATIONS

Derwent Abs. Acc. No. 75–84096W/51.
Derwent Abs. Acc. No. 74–12907V/07.
Derwent Abs. Acc. No. 85–050967/09.
Derwent Abs. Acc. No. 84–146368/23.
Derwent Abs. Acc. No. 84–204992/33.
Derwent Abs. Acc. No. 83–03940K/02.
Derwent Abs. Acc. No. 85–282756/45.
Derwent Abs. Acc. No. 86–048456/08.
Chemical Abs. Ca112(14):124349w.
Chemical Abs. CA88(8) :54693p.
Chemical Abs. CA87(14) :106383p.
Chemical Abs. CA84 (14) :95178k.

FIG.5 DISPLACEMENT OF ACID FROM PRC(-30%) WITH DIPE (STEP(b))

FIG. 6

FIG. 8 DISPLACEMENT OF ADSORBED ACIDS WITH DIPE (STEP (b)) COMPARISON OF SS207C(AW) AND PRC (~30%)

PROCESS FOR SEPARATING COMPONENTS OF A LIQUID MIXTURE

The present invention relates to a separation process and in particular to a process for separating components of a liquid mixture by selective adsorption utilising one or more adsorption columns.

U.S. Pat. No. 5,026,482 describes a process for separating a liquid feedstock comprising a more adsorbable component (A) and a less adsorbable component (B) wherein the relative adsorptivity of component (A), component (B) and a desorbent liquid (D) with respect to an adsorbent in an adsorption column is in the order D≦A>B in a system comprising a plurality of adsorption columns operated in cycle in a predetermined timed sequence, each adsorption column containing an adsorbent, which process comprises the following sequence of operational steps performed in the order recited in each of the adsorption columns in its turn:

(a) passing the feedstock through the adsorption column and selectively adsorbing the more adsorbable component (A) while discharging a stream enriched in component (B);

(b) rinsing the adsorption column in a direction co-current to the feedstock with the more adsorbable component (A) whereby the less adsorbable component (B) is displaced from the adsorption column and withdrawing a stream comprising a mixture of the more adsorbable component (A) and the less adsorbable component (B) from the adsorption column;

(c) rinsing the adsorption column with a liquid desorbent (D) whereby the more adsorbable component (A) and the less adsorbable component (B) are displaced from the adsorbent bed and withdrawing a stream enriched in component (A) from the adsorption column; and (d) rinsing the adsorption column with component (B) whereby the desorbent liquid (D) is displaced from the adsorption column and withdrawing therefrom a stream comprising less adsorbable component (B) and desorbent liquid (D).

Optionally, the process further comprises:

(e) separating the stream of step (c) comprising the more adsorbable component (A) and the desorbent (D) and utilising a portion of the separated desorbent (D) as a source of desorbent (D) in step (c); and (f) separating the stream of step (d) comprising the less adsorbable component (B) and the desorbent liquid (D) and utilising a portion of the separated desorbent (D) as a source of desorbent (D) in step (c).

An example according to U.S. Pat. No. 5,026,482 wherein the order of adsorptivity with respect to the adsorbent is in the order D>A>B is said to be the separation of acetic acid and water wherein the more adsorbable component (A) is acetic acid, the less adsorbable component (B) is water, the desorbent liquid (D) is acetone and the adsorbent is activated charcoal.

Separating the stream of step (d) which comprises (B+D) to produce a (D)-rich and a (B)-rich stream is said to be achieved by distillation in the example described in U.S. Pat. No. 5,026,482. However, this is not entirely satisfactory, for example, such a distillation step may be somewhat costly.

We have now found that in a process for separating the components of a liquid feedstock mixture comprising a more adsorbable component (A) and a less adsorbable component (B) wherein the relative adsorbivity of component (A), component (B) and a desorbent liquid (D) with respect to an adsorbent is in the order D>A>B, by selecting a liquid as desorbent (D) which is immiscible with the less adsorbable component (B), separation of component (B) and the liquid desorbent (D) can be readily achieved.

Thus, according to the present invention there is provided a process for separating components of a liquid mixture comprising a more adsorbable component (A) and a less adsorbable component (B) wherein the relative adsorbity of component (A), component (B) and a desorbent liquid (D) with respect to an adsorbent in an adsorption column is in the order D>A>B, which process comprises the steps in sequence of:

(a) passing the liquid mixture through an adsorption column containing the adsorbent and selectively adsorbing the more adsorbable component (A) while discharging a stream enriched in component (B);

(b) rinsing the adsorbent in the adsorption column after step (a) with a desorbent liquid (D) which is immiscible with the less adsorbable component (B), whereby the more adsorbable component (A) is displaced from the adsorbent by desorbent (D) and withdrawing from the adsorption column a first liquid phase stream comprising a mixture of more adsorbable component (A) and less adsorbable component (B) and withdrawing from the adsorption column a second liquid phase stream comprising a mixture of the liquid desorbent (D) and more adsorbable component (A); and (c) thermally displacing desorbent (D) from the adsorbent in the adsorption column after step (b).

Step (c) may be performed by contacting the adsorbent with a hot gas, vapour and/or liquid, and/or by heating the adsorbent directly or indirectly. Preferably, step (c) is performed by contacting, at elevated temperature, the adsorbent with a vapour comprising less adsorbable component (B) and withdrawing from the adsorption column a vapour and/or liquid stream comprising desorbent (D) and less adsorbable component (B). Optionally, desorbent (D) forms an azeotrope with less adsorbable component (B) whereby the vapour stream withdrawn from the adsorption column comprises an azeotrope of desorbent (D) and less adsorbable component (B). In a further optional step (d), the vapour stream comprising desorbent (D) and less adsorbable component (B), preferably as an azeotrope, withdrawn from the column in step (b) is condensed to form a first liquid phase rich in less adsorbable component (B) and a second liquid phase rich in desorbent (D) and the phases are separated. Optionally, the first liquid phase from step (d) which is rich in less adsorbable component (B) and which also comprises some component (D) as contaminant, is stripped to recover desorbent (D) and to recover component (B). Optionally, the second liquid phase from step (d) which is rich in desorbent (D) and which also comprises some component (B) as contaminant is stripped to recover less adsorbable component (B) and to recover desorbent (D). Component (D) is suitably recycled for use in step (b), optionally after processing to regain purity.

The present invention solves the problem described above by use of a desorbent liquid (D) which is immiscible with component (B) and which optionally forms an azeotrope with component (B) at elevated temperature.

Preferably, when desorbent liquid (D) is less dense than more adsorbable component (A) and less adsorbable component (B), the adsorption column is rinsed in step (b) with desorbent liquid (D) in a downward direction. Preferably, where the desorbent liquid (D) is more dense than more adsorbable component (A) and less adsorbable component (B) the adsorption column is rinsed in step (b) with desorbent liquid (D) in an upward direction.

Preferably, for a commercially operable process, in step (b) the desorbent (D) displaces a large amount of component (A) with a low amount of desorbent passed through the adsorbent column. For example, at least 80% of component (A) displaced within 5 bed volumes of desorbent (D) passed through the adsorbent column. This will depend upon such process factors as the number of adsorbent columns used, the time duration of each step, the temperature at which displacement step (c) is performed, the concentration of components (A), (B) and (D) and the adsorbent used.

The second liquid phase stream withdrawn from the adsorption column in step (b) which comprises a mixture of desorbent (D) and the more adsorbable component (A) may, for example, be fed to a distillation zone wherein the mixture of desorbent (D) and component (A) is separated into component (A) and desorbent (D) which may be recycled for use in the process of the present invention. Most preferably, a desorbent (D) is selected which has a boiling point below that of component (A) in order to facilitate separation of component (A) and desorbent (D) in the distillation zone.

Desorbent liquid (D) is any suitable liquid which is immiscible with and preferably forms an azeotrope with component (B).

Suitably component (D) may be an alcohol, ether, ester, ketone or hydrocarbon having the required properties. Preferably, the desorbent (D) is di-isopropyl ether (DIPE), methyl t-butyl ether, methyl isobutyl ketone or methyl acetate, most preferably di-isopropyl ether (DIPE). Low boiling hydrocarbons, for example n-pentane or toluene may also be used. Without wishing to be bound by any theory, it is believed that desorbents (D) which exhibit a small region of three component miscibility with components (A) and (B) are most suitable for use in the process of the present invention.

The adsorbent used in the adsorption column may be any adsorbent having an order of adsorptivity with respect to desorbent (D), component (A) and component (B) of (D)>(A)>(B), for example, an activated carbon such as those derived from coconut shell or phenolic resin. Preferably, the adsorbent is highly micro-porous activated carbon, preferably prepared from phenolic resin, preferably according to the process described in U.S. Pat. No. 4,917,835. U.S. Pat. No. 4,917,835 describes a process for the production of a shaped porous carbon article which comprises (a) partially curing a phenolic resin mixture to a solid, (b) comminuting the partially cured resin, (c) forming the resulting comminuted resin into a predetermined shape, (d) sintering the compound resin so as to produce a form-stable sintered product, and (e) carbonizing the shaped article; the temperature and duration of the curing step (a) being so selected as to give a degree of cure sufficient to give a sinterable product. According to U.S. Pat. No. 4,917,835, phenolic resins are well known materials. They are made by the reaction of a phenol and an aldehyde e.g. formaldehyde. The condensation is initially carried out to produce a partially condensed product. The condensation may be carried out so as to produce a resin which is fully curable on further heating. Alternatively the condensation may be carried out so as to produce a novolak resin which is only curable when an additional cross-linking agent is mixed with it e.g. hexamethylene tetramine (known as "hexamine" or "hex"). It is preferred to use hexamine-cured novolak resins. According to U.S. Pat. No. 4,917,835, in order to produce comminuted resin which can be sintered satisfactorily it is necesearry to control the temperature and duration of the partial curing step, and the quantity of any cross-linking agent used. According to U.S. Pat. No. 4,917,835, the sintering step may be carried out by applying heat to the phenolic resin particles, by applying pressure or by a combination of both. According to U.S. Pat. No. 4,917,835, the carbonization is carried out by heating the shaped articles at temperatures above 600° C. and the duration of the heating step may be for example 1 to 48 hours. The carbonization step may be carried out at least in part under an inert atmosphere or in a vacuum and then the carbonized carbon is subsequently activated. Typically the activated carbon for use in the process of the present invention is prepared from phenolic resin derived carbon prepared according to U.S. Pat. No. 4,917,835 which has been activated in air, steam, and/or carbon dioxide, preferably carbon dioxide or steam although some forms of chemical activation may be used. The activation may be performed simultaneously with the carbonization step of the carbon preparation by using carbon dioxide or steam. Preferably the carbon is activated at 800° C. with carbon dioxide. Preferably, the carbon is activated with a weight loss of about 10 to 50%.

Any suitable pressure, typically atmospheric, may be used for steps (a), (b) and (c) of the process of the present invention.

Any suitable temperature may be used for steps (a) and (b) provided that phase separation of the first and second liquid phase in step (b) is maintained. Preferably, when desorbent (D) is DIPE, step (b) is performed at a temperature of less than 40° C. to maintain phase separation of the first and second liquid phase streams.

The elevated temperature in step (c) may be achieved by contacting the adsorbent with hot vapour, and/or liquid comprising component (B) and/or heating with a hot gas and/or by separately heating the adsorbent directly and/or indirectly.

The process of the present invention may be operated using a single adsorption column or preferably a plurality of adsorption columns operated in cycles in phased relationship to each other as is known in the art.

The flow rates of liquid streams through the adsorption coloumn in each step are typical of those known to persons skilled in the art, for example up to 10 bed volumes per hour.

In one particularly preferred embodiment of the present invention there is provided a process for separating (A) one or more carboxylic acids having carbon atoms where n=1–6, for example formic, acetic, propionic or butyric acid from (B) water in an aqueous effluent stream. Preferably, the aqueous effluent stream is produced in a process for the oxidation of naphtha, butane and the like; in a process for the carbonylation of alkanols, for example, methanol or a reactive derivative thereof; or in other industrial processes. Typically, such an aqueous effluent stream may comprise 100 ppm to 20% by weight carboxylic acids in water but lower or higher concentrations of acids may be used. A suitable adsorbent for such a system is a micro-porous activated carbon derived from phenolic resin.

The invention will now be illustrated by reference to the following drawings in which.

Figure 1:
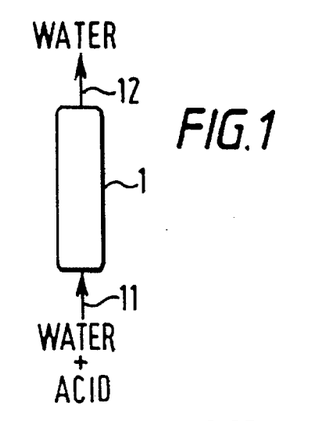
FIGS. 1 to 3 represent in schematic form, absorbent columns operating according to the steps of the process of the present invention.

FIG. 1 illustrates step (a) of the present invention. A mixture comprising water as component (B) and carboxylic acid such as acetic acid as component (A) is passed upwardly through inlet (11) and through adsorption column (1) which contains an activated carbon adsorbent. A stream enriched in water (B) is discharged from the adsorption column through outlet (12). Depending upon the capacity of the adsorbent, where component (A) is for example, 5000 to 10000 ppm by weight acetic acid, up to 10 bed volumes of mixture may be passed through the adsorption column. At the end of this step (a) the carbon adsorbent may be expected to have adsorbed at least 5 to 10% by weight of carboxylic acid and the voids and pores within the adsorbent will be filled with mixture of varying concentration of acid.

Figure 2A:
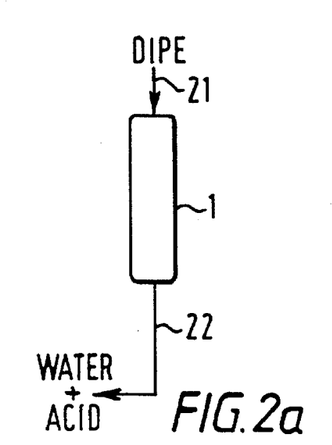
Figure 2B:
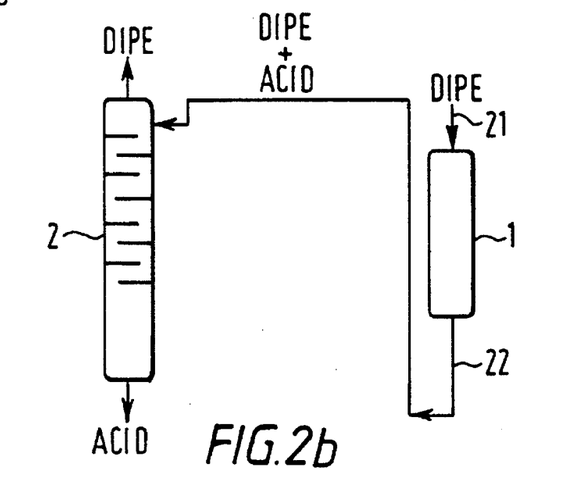

FIG. 2 illustrates step (b) of the present invention. The adsorption column (1) after step (a) is rinsed in a downward direction, counter-current to the feed of step (a), with di-isopropyl ether (DIPE) as desorbent liquid (D) which is less dense than component (B) and which is introduced through inlet (21). In the initial period of step (b) the DIPE displaces liquid from the voids and pores within the adsorbent and a first liquid phase stream comprising water (B) and carboxylic acid (A) is withdrawn from the adsorption column (1) through outlet (22). This first liquid phase is combined with the mixture of (A) and (B) and used in subsequent step (a) of the process of the present invention. By rinsing in a downward direction with the less dense DIPE "fingering" is avoided. In the subsequent period of step (b) (FIG. 2b) DIPE displaces carboxylic acid from the adsorbent and a second liquid phase stream comprising carboxylic acid (A) and di-isopropyl ether (DIPE) (D) typically at least 1–2% by volume acid, is withdrawn from the adsorption column. The first and second liquid phase streams are immiscible with respect to each other. The second liquid phase stream of carboxylic acid and di-isopropyl ether (DIPE) with trace amounts of water is fed to a distillation zone (2) wherein carboxylic acid is withdrawn from the base of the distillation zone (2). A di-isopropyl ether (DIPE) recycle stream having a boiling point lower than that of the carboxylic acid is withdrawn from the head of the distillation zone (2) and may optionally be recycled to step (a) of the process. At the end of step (b) the voids and pores of the adsorbent will be filled with nominally pure DIPE.

Figure 3:
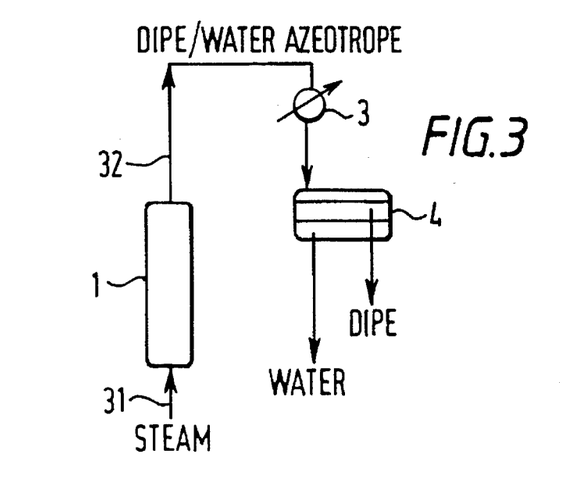

FIG. 3 illustrates a preferred method of performing step (c) and optional step (d) of the present invention. The adsorption column (1) after step (b) is optionally drained of DIPE and then contacted with steam as component (B) through inlet (31) and a vapour stream comprising an azeotrope of di-isopropyl ether (DIPE) and steam is removed from the adsorption column (1) through outlet (32). The vapour stream is condensed by being passed through condenser (3) and is then separated in decanter (4) into a lighter di-isopropyl ether-rich phase and a heavier water-rich phase. The two phases are withdrawn separately from the decanter to form a water rich effluent stream typically containing about 0.3% by weight DIPE and a di-isopropyl ether (DIPE) rich recycle stream containing a finite amount of water. Optionally, the water rich effluent stream may be stripped to recover di-isopropyl ether which may be recycled to the process of the present invention and the water disposed of, for example to effluent and/or recycled for use in step (c) of the process of the present invention. The di-isopropyl ether rich stream may be recycled to the process of the present invention.

The invention will be further illustrated by reference to the following examples and to FIGS. 4 to 8.

EXAMPLES 1 and 2

General Experimental Procedure

Figure 4A:
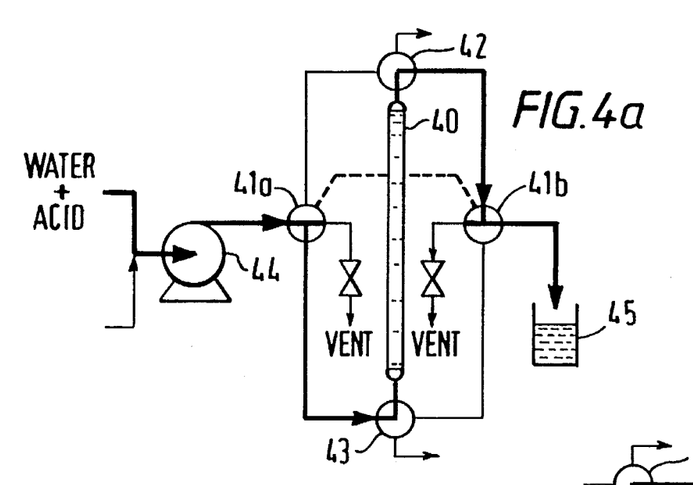
FIGS. 4a to 4c represent equipment used to demonstrate steps (a), (b) and (c) of the present invention

The equipment used for the examples described below is shown in FIG. 4. This was constructed using glass liquid chromatography columns with PTFE end caps and sinters and all PTFE interconnecting tubing to minimise problems with adsorption and loss of acid in the system. The adsorption column was 46 cm×10 mm ID giving a volume of 35.13 cm$^3$. Feed was via a high pressure liquid chromatography pump. This allowed precise control of flow and a double-ganged valve (41) allowed rapid switching between the feed mixture (3000 ppm wt acetic/3000 ppm formic acids in water) for step (a), and the di-isopropyl ether (DIPE) desorbent liquid for step (b). The experiments were carried out at room temperature (ca.25° C.). The operation of the equipment can be followed from FIG. 4. The liquid flow follows the heavy black lines. Valves (42) and (43) and the two vent valves were used prior to passing the feed mixture/solvent through the adsorption column to ensure that the lines are free from liquid left from the previous step of operation. The general operation sequence was as follows:

Step (a) Adsorption (FIG. 4)

Starting with a fresh carbon adsorbent bed (40) full of water, valve (41) was set as shown and dilute aqueous acid was pumped via pump (44) first out of the vent valve (43) at the base of the column. This ensured that all of the lines through to the column base were full of acid/water mixture prior to starting the adsorption cycle. Acid/water mixture was then pumped up the column and through valve 42 to valve (41b) and out to the product receiver (45). When breakthrough was observed by total organic carbon (TOC) analysis the pump was switched off.

Figure 4B:
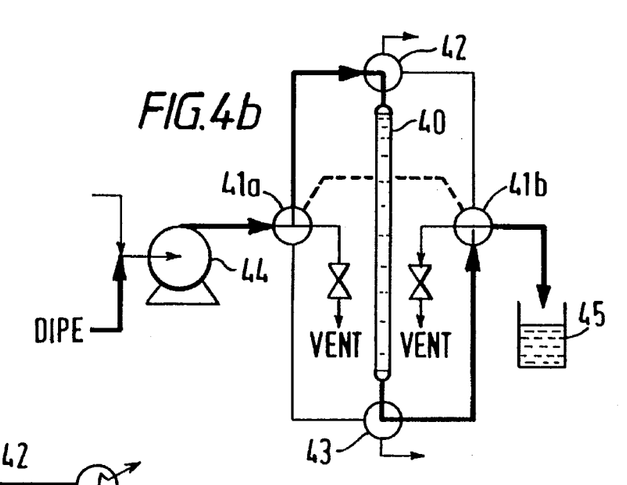

Step (b) Rinsing with desorbent (FIG. 4b)

After breakthrough has occurred, valve (41) was switched to the position shown in FIG. 4b which allowed the feed flow to pass to the top of the column. With valves (42) and (43) again closed to isolate the column, DIPE was pumped via valve (42) to effluent to displace residual acid/water from the lines. Valves (42) and (43) were then opened to the adsorption column and the DIPE flowed down through the column, displacing the water/dilute acid, back to valve 41b and then to the product receiver (45). A first liquid phase stream comprising acid and water was withdrawn initially from the adsorption column followed by a second liquid phase stream comprising DIPE and acid.

Figure 4C:
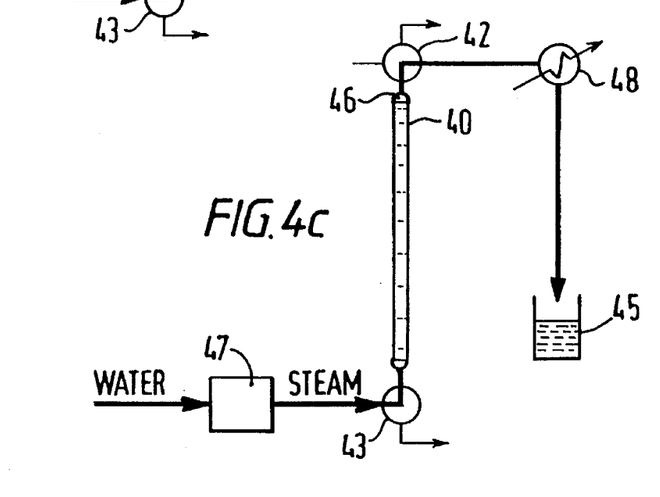

Step (c) Thermally displacing desorbent (FIG. 4c)

After the acid had been displaced in step (b), valve (41) was by-passed and valves (42) and (43) were switched to the positions shown in FIG. 4c. The carbon adsorbent in the adsorption column (40), saturated with DIPE after step (b), was heated to 150° C. by means of an oil recirculating bath and an oil jacket (not shown) fitted around the column (40). A stable temperature was achieved after a period of approximately 15 minutes, during which time some DIPE was thermally displaced for the adsorbent and condensed at the column outlet (46). During this period a furnace pre-heater (47), containing a vaporiser filled with glass beads, was heated to a temperature of 490° C. Once the furnace pre-heater and column were at temperature, water was pumped into the vaporiser to generate steam exiting from the vaporiser at a temperature of 140° C., which was passed up through the column (40) via valve (43).

The exit stream from the column was condensed in condenser (48) to form, initially, a two phase composition, a first liquid phase rich in water and a second liquid phase rich in DIPE. After approximately one bed volume of liquid had been displaced from the column, the condensate was found to comprise water and soluble DIPE. Steam was allowed to continue to flow through the column until the concentration of DIPE in the condensate fell to approximately 100 ppm. Steam flow was then stopped and the column was allowed to cool for step (a).

Carbon Adsorbent Preparation

In the Examples, two types of carbon adsorbent were used; a commercial coconut shell carbon provided by Sutcliffe Speakman (207C) and a synthetic phenolic resin derived carbon (PRC). The PRC extrudate prepared according to patent U.S. Pat. No. 4,917,835 with carbonisation under nitrogen was activated at 800° C. in carbon dioxide to 30% weight loss (PRC-30).

The test procedure for the two carbons was slightly different reflecting the presence of inorganic impurities in the Sutcliffe carbon. All carbons were sieved prior to use and only the 500–1000 μm fraction was used in the tests. It was necessary to grind the PRC carbon, which was produced as 1.5 mm extrudate, to obtain the required particle size. The 207C carbon was supplied as a mesh range containing the required fraction and only required sieving.

The PRC carbon was boiled in distilled water for 3 hours and then allowed to cool. This ensured that the pore structure was totally filled with water. After thorough washing with distilled water using a Buchner funnel the carbon, still wet, was loaded into the column. The whole procedure was carried out ensuring that the carbon remained wet at all times to prevent the pore structure drying out. The amount of carbon loaded into the column was determined from the column volume and carbon dry bulk density (PRC-30:0.52 g/cc, SS207C:0.52 g/cc). The column was then sealed using PTFE valves to prevent the carbon from drying out until required.

It was necessary to acid wash the SS 207C carbon prior to use to remove inorganic impurities which interfere with the adsorption stage of the test. 50 g of the SS 207C carbon were refluxed in 500 ml of 10% HCl for 2 hours. The carbon was then thoroughly washed with several aliquots of distilled water in the flask prior to Buchner filtering and washing with a further several aliquots of distilled water. The carbon was then loaded in the column as for the PRC carbon.

Test Procedure

The valves in the system (FIG. 4) are arranged so that the dilute acid only flowed up through the bed during the adsorption phase (step (a)) of the test and the DIPE flowed counter current (down) through the bed during the rinsing (step (b)) phase. The valves were a double ganged assembly so that the flow can be reversed by a single action.

Step (a) Acid Adsorption

The experiment consisted of flowing the dilute acid stream up through the carbon bed at a flow rate of approximately 3 LHSV. The total effluent was collected in approximately 25 g aliquotes, and the weight of each portion noted to determine the liquid velocity and the cumulative number of bed volumes passed. The acid concentration in each aliquot was determined as "total organic carbon" (TOC) using a Dohrmann Carbon analyser. This cannot distinguish between acetic and formic acids but allowed the breakthrough point to be determined accurately. The adsorption phase, step (a), of the experiment was stopped when the TOC was rising rapidly. Back extrapolation of the breakthrough curve allowed the precise breakthrough volume to be determined. The acid content of the effluent stream was then determined using ion exclusion chromatography for the samples immediately before and after the breakthrough point. The total amount of adsorbed acid at breakthrough was determined from the weight of effluent collected at breakthrough multiplied by acid concentration.

Step (b) Rinsing (Desorption)

In desorption the DIPE was flowed down the bed, countercurrent to the adsorption cycle, as would be done in a commercial plant. The flow rate of the DIPE was typically around 2.7 LHSV.

During the first period of desorption the DIPE displaced the free dilute acid from the voids between the carbon particles and from the pores of the carbon. It is essential for the process that no "fingering" occurs during this stage and that a "clean" interface between the displaced acid and DIPE is found. This could be observed in the outlet PTFE tube from the column. As soon as DIPE was observed in the outlet the produce receiver was changed. The weight of displaced dilute acid was noted.

|  | Displaced acid |
| --- | --- |
| PRC-30 | 22.67 g |
| SS207C | 19.55 g |

Figure 5:
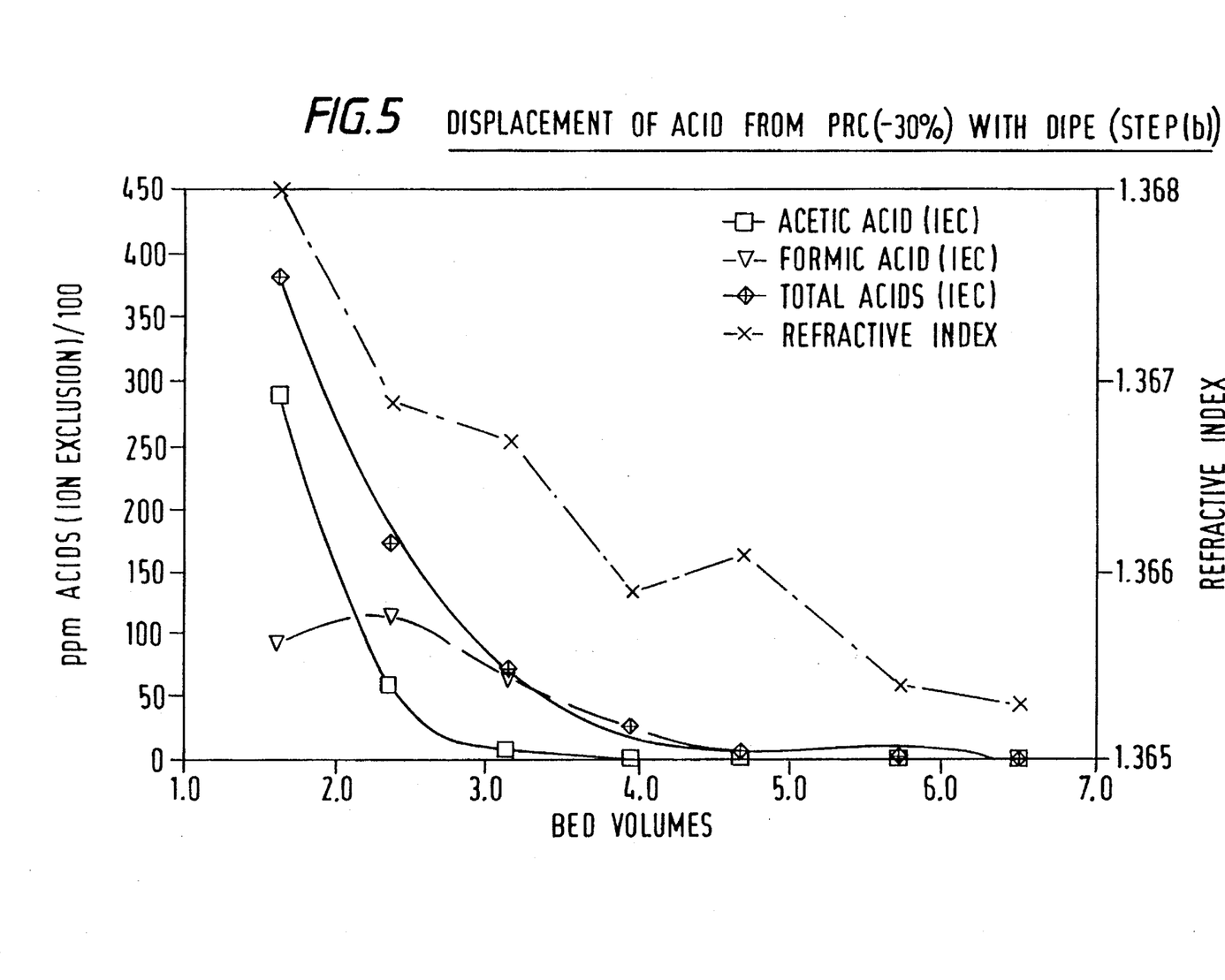
FIGS. 5 to 8 represent in graph form the results obtained therein.

The total DIPE effluent was collected as before and the weight of each sample noted. This was converted to volume using the density of the DIPE. This lead to a small error when there was significant acid content, in the case of the PRC-30 the LHSV dropped from an initial value of 3.14 to 2.64 during the course of step (b). An initial indication of the efficiency of step (b) process was obtained from the refractive index (RI) of the effluent. A comparison of the RI and actual acid concentrations measured by ion exclusion chromatography (IEC) is shown in FIG. 5 for the PRC-30. It can be seen that the RI trend followed the total acid concentration trend reasonably closely.

Step (c)

Thermal displacement of DIPE from the adsorption column was not simulated in Examples 1 and 2.

Results

Figure 6:
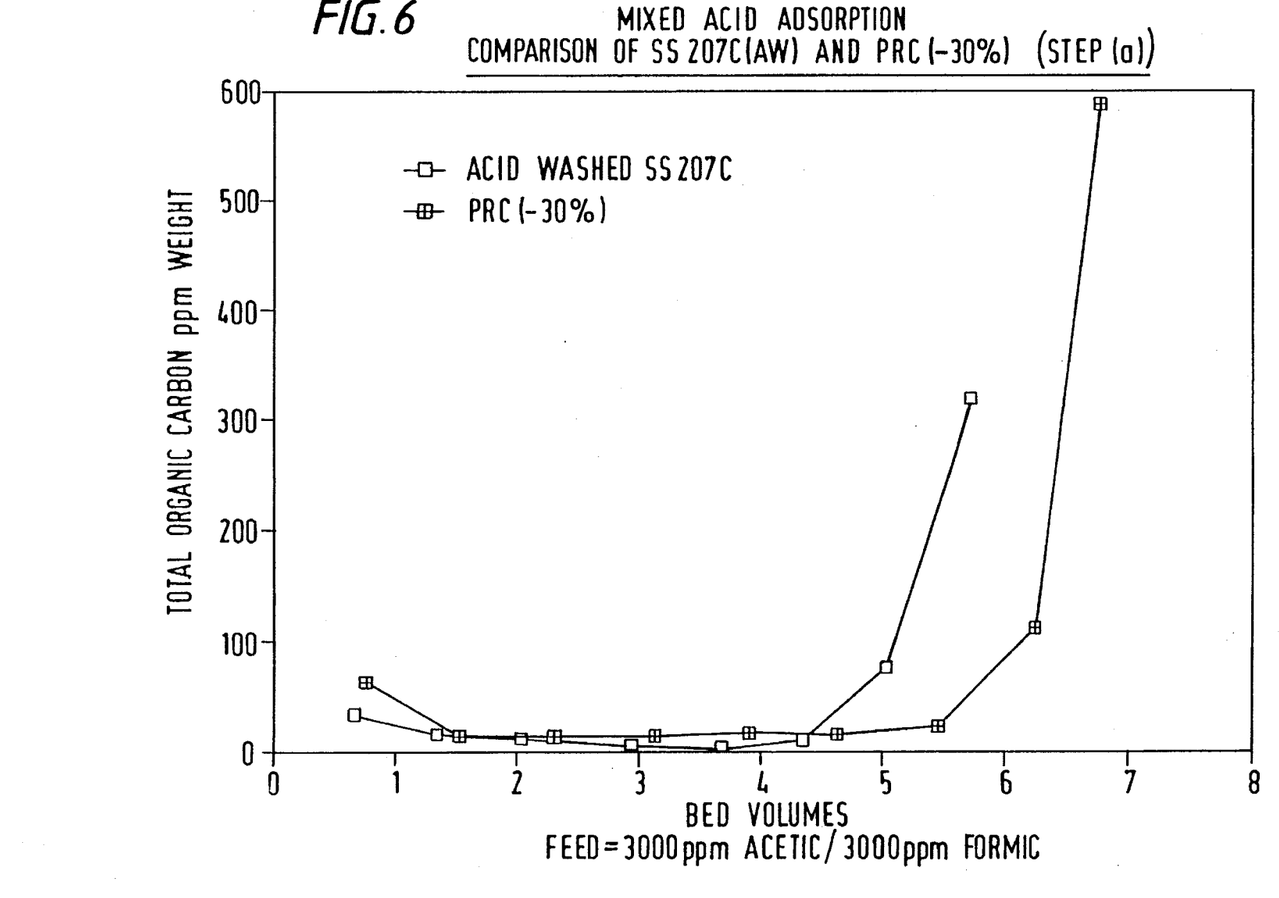

The adsorption results for step (a) for the two carbons examined in detail (PRC-30 and SS 207C) are shown in FIG. 6. It can be seen that the breakthrough for the PRC, Example 1, occured after approximately 5.5 bed volumes whilst for the SS 207C, Example 2, this occured after approximately 4.5 bed volumes. This indicates that the PRC had approximately a 25% higher capacity under these conditions.

Figure 7:
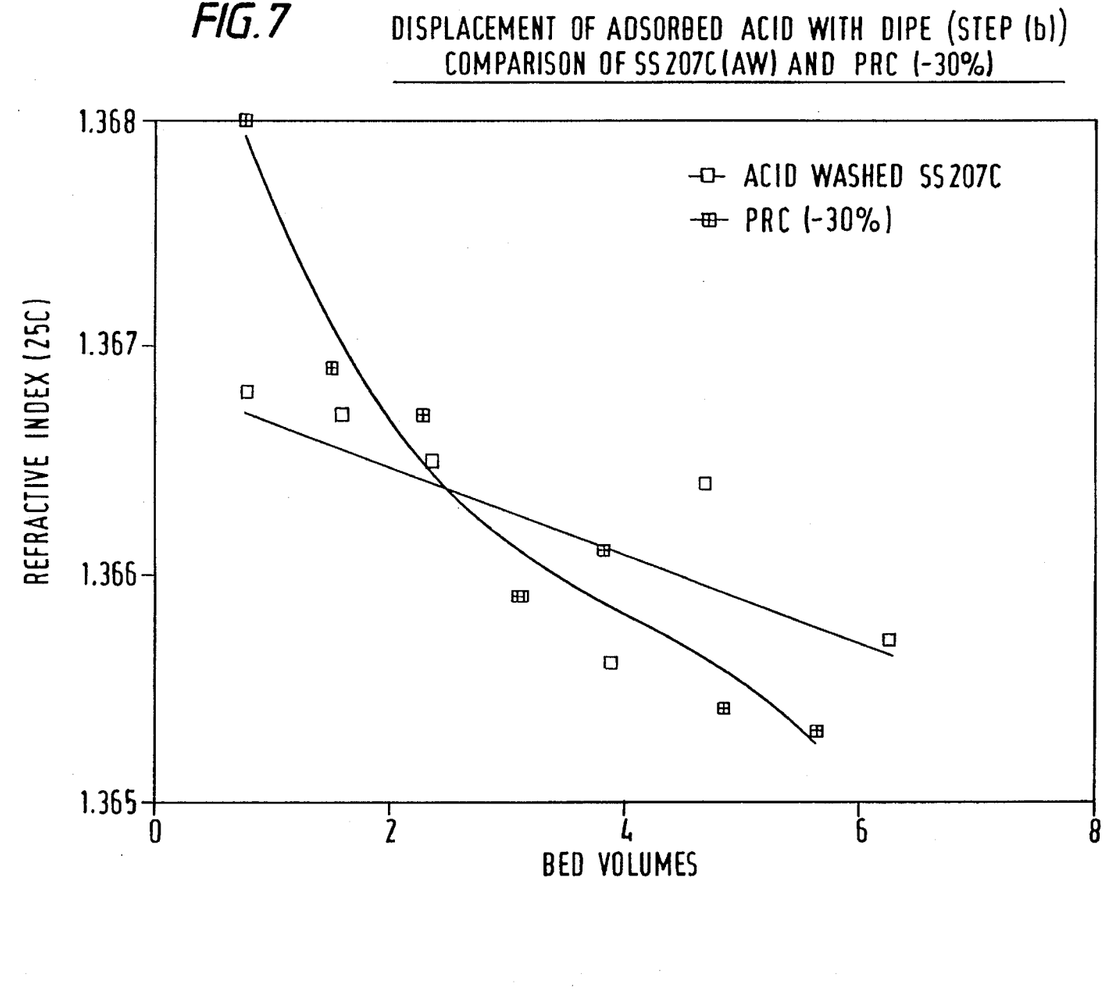
Figure 8:
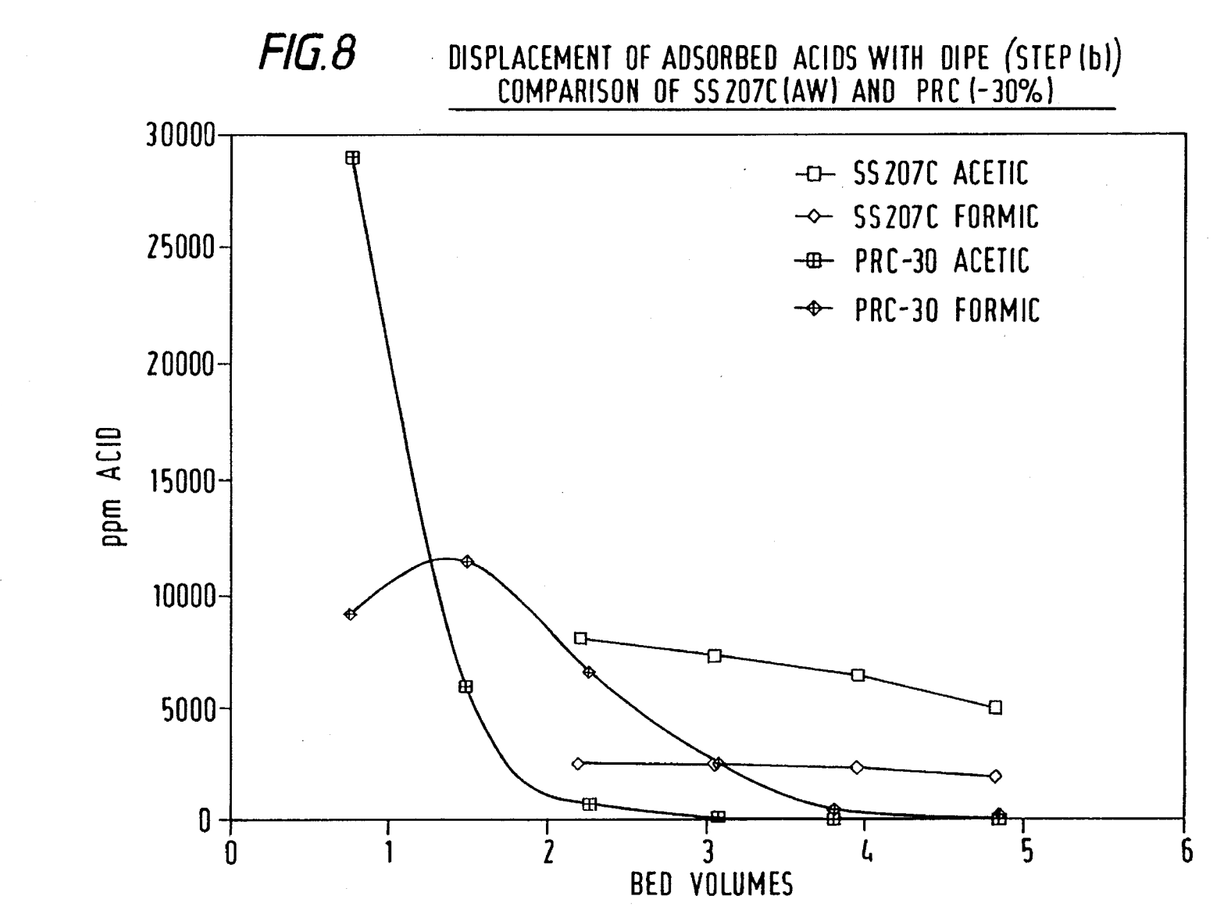

A further difference between the adsorbents was observed in their regenerability. FIG. 7 shows the DIPE refractive index trends for the two materials. It can be seen that the PRC, Example 1, had an initially very high RI that dropped rapidly whilst the SS 207C, Example 2, started at an intermediate level and remained high even after 6 bed volumes. This is shown in greater detail in FIG. 8 where the ppm of acetic and formic acids in the effluent DIPE are plotted against bed volumes. After approximately 3 bed volumes the majority of the acetic acid had been removed from the PRC-30 bed whilst for the SS 207C the acetic concentration was still around 5000 ppm after 5 bed volumes. This is also reflected in the acetic concentration at the start of step (b) which reached about 3% weight for the PRC-30 but only 0.8% for the SS 207C.

The overall efficiency of the process can be determined from the weight of acid recovered during step (b) relative to the weight of acid adsorbed. For the PRC-30 the acetic acid recovery was 97.3% and the formic acid recovery was 83.4% whilst in the case of the SS 207C the acetic acid recovery was less than 50% after 5 bed volumes of DIPE. This would make the operation of a cyclic process with the SS 207C less attractive industrially for these acids in water and operation with phenolic resin-derived activated carbon adsorbent is preferred.

EXAMPLES 3 and 4

For these examples the same apparatus and general procedure as previously described was used.

In these examples the process of Examples 1 and 2 was repeated with additionally thermal displacement, step (c) using steam. The adsorbent was subjected to a number of cycles of steps (a) to (c). Since the adsorbent's capacity from one cycle to another will only stay reasonably constant if all of the acid is displaced by the DIPE and all of the DIPE is displaced by the steam, the impact of steps (b) and (c) can be monitored in a sequence of cycles from the breakthrough time of the acid during step (a). In these examples there was some evidence for some loss of capacity during the first 10 cycles.

EXAMPLE 3

The carbon adsorbent was a PRC prepared according to U.S. Pat No. 4,917,835 with nitrogen carbonization and activated to 35% weight loss with carbon dioxide at 800° C. (cf 30% activated carbon for Example 1). The adsorbent bed was subjected to 6 cycles of adsorption in step (a) at room temperature followed by step (b) with DIPE at room temperature and steam displacement in step (c). Then the temperature of the steps (a) and (b) were increased. The results are shown in Table 1 below:

TABLE 1

| Cycle Number | Temperature of steps (a) and (b) | Acid breakthrough in step (a) (bed volumes) |
| --- | --- | --- |
| 1 | room temperature | 5.2 |
| 2 | room temperature | 5.0 |
| 6 | room temperature | 4.7 |
| 10 | room temperature | 4.5 |
| 11 | 30° C. | 4.0 |
| 12 | 40° C. | 3.6(a) |
| 13 | 50° C. | 3.1(a) |

(a)discolouration during step (b) and problems with phase separation of first and second liquid phase streams in step (b).

EXAMPLE 4

The first three cycles of Example 3 were repeated using Speakman 207C (coconut shell) carbon. The results are shown in Table 2 below.

TABLE 2

| Cycle Number | Temperature of steps (a) and (b) | Acid breakthrough in step (a) (bed volumes) |
| --- | --- | --- |
| 1 | room temperature | 4.8 |
| 2 | room temperature | 4.1 |
| 3 | room temperature | 4.0 |

We claim:

1. A process for separating components of a liquid mixture comprising a more adsorbable component (A) and a less adsorbable component (B) wherein the relative adsorbity of component (A), component (B) and a desorbent liquid (D) with respect to an adsorbent in an adsorption column is in the order D>A>B, which process comprises the steps in sequence of:

(a) passing the liquid mixture through an adsorption column containing the adsorbent and selectively adsorbing the more adsorbable component (A) while discharging a stream enriched in component (B);

(b) rinsing the adsorbent in the adsorption column after step (a) with desorbent liquid (D) which is immiscible with the less adsorbable component (B) whereby the more adsorbable component (A) is displaced from the adsorbent by desorbent (D) and withdrawing from the adsorption column a first liquid phase stream comprising a mixture of more adsorbable component (A) and less adsorbable component (B) and withdrawing from the adsorption column a second liquid phase stream comprising a mixture of desorbent (D) and more adsorbable component (A); and (c) thermally displacing desorbent (D) from the adsorbent in the adsorption column after step (b).

2. A process as claimed in claim 1 in which in step (c) desorbent (D) is displaced from the adsorbent by contacting the adsorbent at elevated temperature with a vapour comprising less adsorbable component (B) and withdrawing a vapour and/or liquid stream comprising desorbent (D) and less adsorbable component (B) from the adsorption column.

3. A process as claimed in claim 2 in which desorbent (D) forms an azeotrope with less adsorbable component (B) and the vapour stream withdrawn from the adsorption column in step (c) comprises an azeotrope of desorbent (D) and less adsorbable component (B).

4. A process as claimed in claim 3 in which the vapour stream withdrawn from the adsorption column in step (c) is condensed to form a first liquid phase rich in less adsorbable component (B) and a second liquid phase rich in desorbent (D) the phases are separated.

5. A process as claimed in claim 4 in which the first liquid phase rich in less adsorbable component (B) is stripped to recover desorbent (D) and to recover less adsorbable component (B).

6. A process as claimed in claim 4 in which the second liquid phase rich in desorbent (D) is stripped to recover less adsorbable component (B) and to recover desorbent (D).

7. A process as claimed in claim 2 in which the vapour stream withdrawn from the adsorption column in step (c) is condensed to form a first liquid phase rich in less adsorbable component (B) and a second liquid phase rich in desorbent (D) and the phases are separated.

8. A process as claimed in claim 7 in which the first liquid phase rich in less adsorbable component (B) is stripped to recover desorbent (D) and to recover less adsorbable component (B).

9. A process as claimed in claim 7 in which the second liquid phase rich in desorbent (D) is stripped to recover less adsorbable component (B) and to recover desorbent (D).

10. A process as claimed in claim 1 in which the desorbent liquid (D) is less dense than more adsorbable component (A) and less adsorbable component (B) and the adsorption column is rinsed with desorbent liquid (D) in a downward direction in step (b).

11. A process as claimed in claim 1 in which the second stream withdrawn from the adsorption column in step (b) which comprises a mixture of desorbent (D) and more adsorbable component (A) is fed to a distillation zone wherein the mixture of desorbent (D) and more adsorbable component (A) is separated into component (A) and desorbent (D).

12. A process as claimed in claim 11 in which desorbent (D) has a boiling point below that of more adsorbable component (A).

13. A process as claimed in claim 1 in which desorbent (D) is selected from the group consisting of di-isopropyl ether, methyl t-butyl ether, methyl isobutyl ketone, methyl acetate, n-pentane and toluene.

14. A process as claimed in claim 1 in which the adsorbent used in the adsorption column is a micro-porous activated carbon.

15. A process as claimed in claim 14 in which the activated carbon is derived from a phenolic resin.

16. A process as claimed in claim 15 in which the carbon is activated with a 10 to 50% weight loss.

17. A process as claimed in claim 1 in which the more adsorbable component (A) is one or more carboxylic acids having n carbon atoms where n=1 to 6 and the less adsorbable component (B) is water.

18. A process as claimed in claim 17 in which the carboxylic acids are selected from the group consisting of formic, acetic, propionic and butyric acids.

19. A process as claimed in claim 18 in which the liquid mixture comprises 100 ppm to 20% by weight carboxylic acids in water.

20. A process as claimed in claim 1 in which the process is operated using a plurality of adsorption columns operated in cycles in phased relationship to each other.

21. A process for separating components of a liquid mixture comprising one or more carboxylic acids having n carbon atoms where n=1 to 6 and water which process comprises the steps in sequence of:

(a) passing the liquid mixture through an adsorption column containing a micro-porous activated carbon and selectively adsorbing the one or more carboxylic acids while discharging a stream enriched in water;

(b) rinsing the activated carbon in the adsorption column after step (a) with liquid di-isopropyl ether whereby the one or more carboxylic acids are displaced from the adsorbent and withdrawing from the adsorption column a first liquid phase stream comprising a mixture of the one or more carboxylic acids and water and withdrawing from the adsorption column a second liquid phase stream comprising a mixture of di-isopropyl ether and the one or more carboxylic acids; and (c) thermally displacing the di-isopropyl ether from the activated carbon in the adsorption column after step (b).

22. A process as claimed in claim 21 in which step (c) di-isopropyl ether is displaced from the activated carbon in the adsorption column by contacting the activated carbon with steam and withdrawing a vapour and/or liquid stream comprising di-isopropyl ether and water.

23. A process as claimed in claim 22 in which the vapour stream withdrawn from the adsorption column in step (c) is condensed to form a first liquid phase rich in water and a second liquid phase rich in di-isopropyl ether, and the phases are separated.

* * * * *